United States Patent [19]

Cocuzzi

[11] Patent Number: 5,015,398
[45] Date of Patent: May 14, 1991

[54] METHOD AND APPARATUS FOR FILTRATION OF PHOTOGRAPHIC EMULSIONS

[75] Inventor: Paul F. Cocuzzi, Holley, N.Y.

[73] Assignee: Eastman Kodak Company, Rochester, N.Y.

[21] Appl. No.: 349,460

[22] Filed: May 9, 1989

[51] Int. Cl.$^5$ .................... B01D 19/00; B01D 29/23
[52] U.S. Cl. .................... 210/767; 210/406; 210/476; 210/482; 210/497.3
[58] Field of Search ............... 210/473, 474, 476, 477, 210/482, 497.3, 406, 767

[56] References Cited

U.S. PATENT DOCUMENTS

| 1,137,266 | 4/1915 | James | 210/482 |
|---|---|---|---|
| 1,536,890 | 5/1925 | Lagemann | 210/476 |
| 2,172,031 | 9/1939 | Norman | 210/473 |
| 2,185,512 | 1/1940 | McHale | 210/497.3 |
| 3,516,478 | 6/1970 | Dunn et al. | 210/482 |
| 3,793,805 | 2/1974 | Hoffman | 55/201 |
| 3,904,392 | 9/1975 | Vaningen et al. | 55/194 |
| 4,035,294 | 7/1977 | Landers et al. | 210/117 |
| 4,290,888 | 9/1981 | Gartmann et al. | 210/474 |
| 4,341,642 | 7/1982 | Koepke et al. | 210/767 |
| 4,522,713 | 6/1985 | Nussbaumer et al. | 210/406 |
| 4,643,981 | 2/1987 | Card | 210/359 |
| 4,731,184 | 3/1988 | Ostreicher et al. | 210/450 |
| 4,774,058 | 9/1988 | Mehl | 210/497.3 |
| 4,828,717 | 5/1989 | DeLeeuw et al. | 210/740 |

FOREIGN PATENT DOCUMENTS

| 904904 | 6/1986 | Belgium . |
|---|---|---|
| 138037 | 8/1978 | German Democratic Rep. . |
| 242094 | 6/1980 | German Democratic Rep. . |
| 211409 | 11/1983 | German Democratic Rep. . |

Primary Examiner—Robert A. Dawson
Assistant Examiner—Wanda L. Millard
Attorney, Agent, or Firm—Paul A. Leipold

[57] ABSTRACT

The invention is generally accomplished by providing an apparatus for filtering that comprises a liquid container and a filtering container designed to be placed within the liquid container. The filtering container is provided with filtering areas on the bottom and/or sides that allow liquid to pass through the sides of the filtering container and be filtered. The liquid then may be withdrawn by pumping from the filtering container. In a preferred form of the invention the containers are closely contoured such that the filtering container fits within the liquid container so that there is very little waste when filtered liquid is withdrawn from the filtering container.

16 Claims, 5 Drawing Sheets

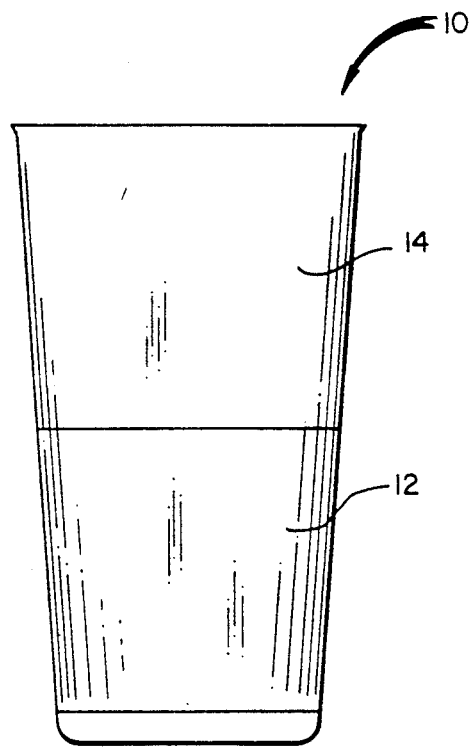
FIG. 1
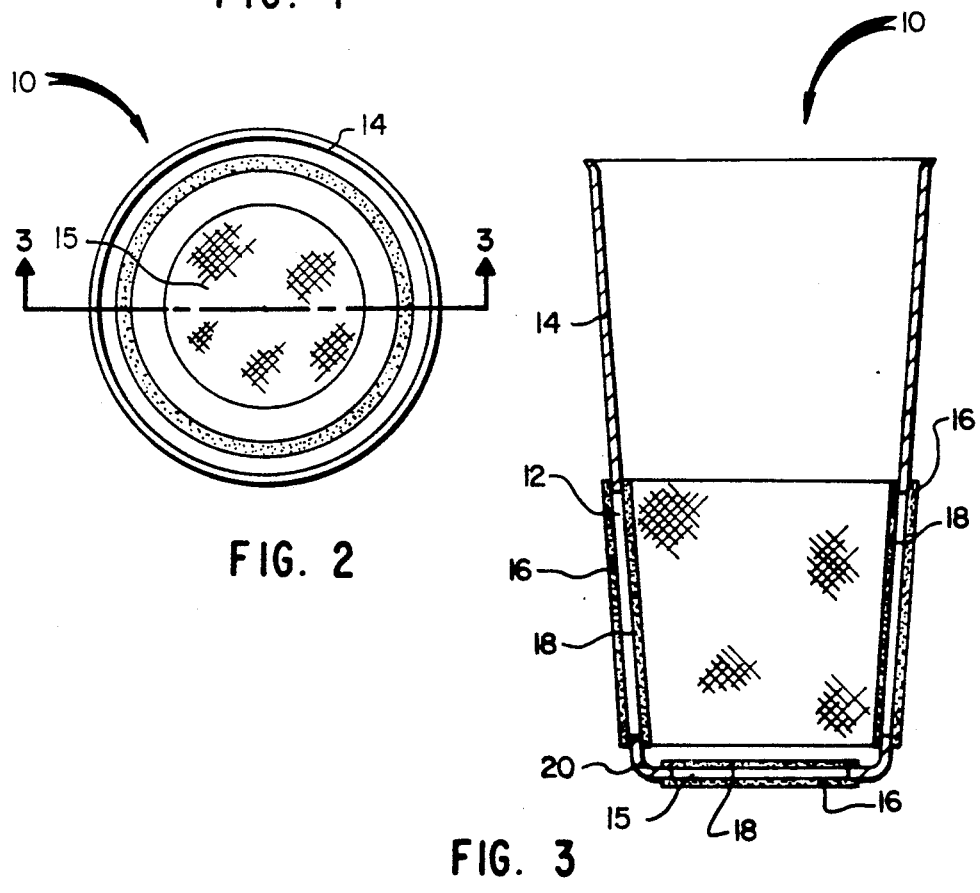
FIG. 2
FIG. 3

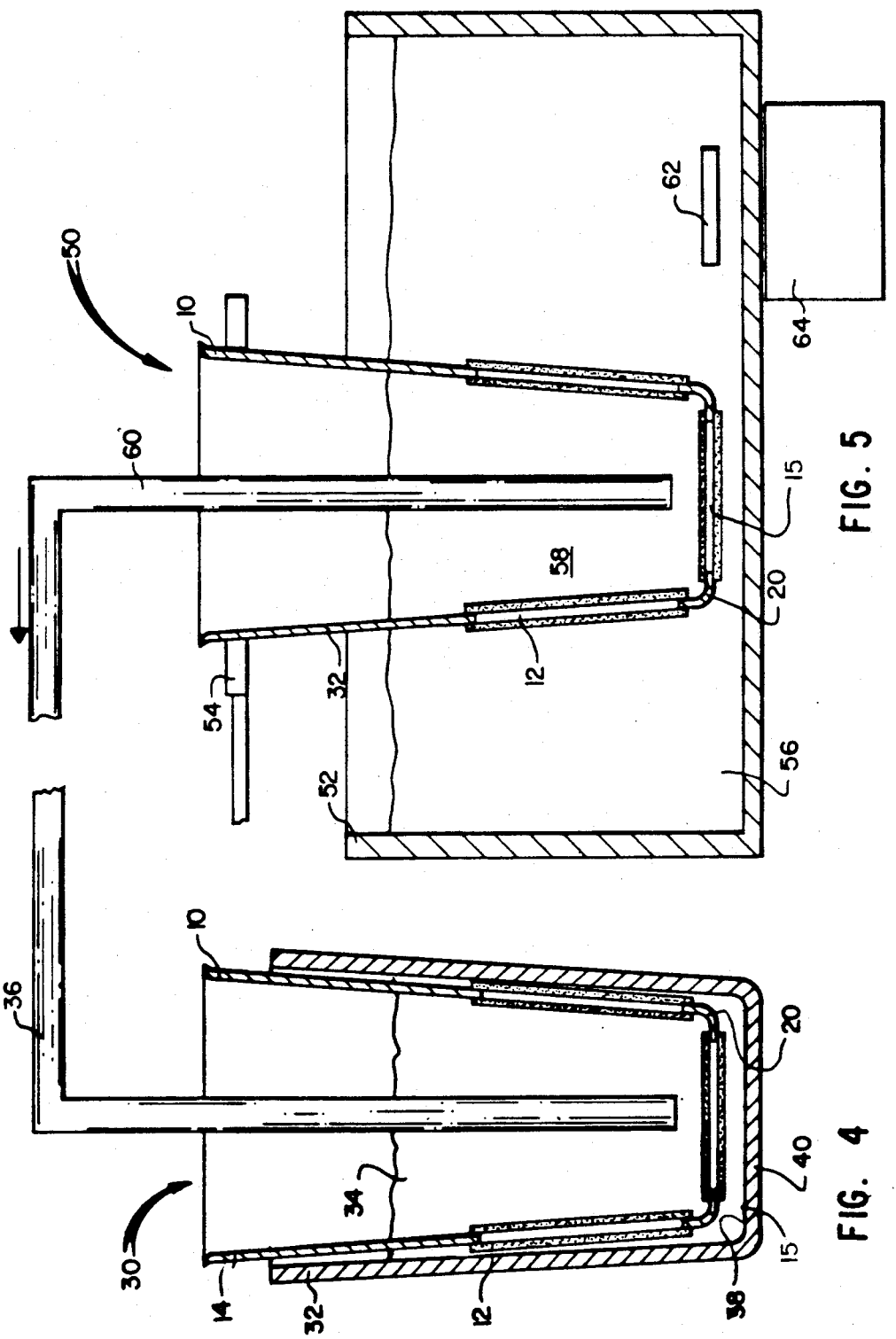

METHOD AND APPARATUS FOR FILTRATION OF PHOTOGRAPHIC EMULSIONS

FIELD OF THE INVENTION

The invention relates to processes and apparatus for filtering liquid materials to remove particles and bubbles. It more particularly relates to the filtration of photographic emulsions containing bubbles and particles that would interfere with lay down of the emulsion in formation of a photographic element.

PRIOR ART

In the formation of photographic material in the laboratory, pilot scale and production facilities have a need to remove bubbles and particles from the emulsions or melts prior to their being coated onto a photographic support material. This problem is particularly apparent in the operation of small production or pilot facilities. With these facilities the use of expensive degassing and filtration devices is not practical as the emulsions are in small batches that often amount to less than a liter. It has been the practice to pour these materials through filters. This has not been completely successful particularly in removal of bubbles, as the pouring of the materials through the filters does not remove all bubbles and may even create more. In filtering of materials in pilot scale another difficulty is the switching of different emulsion containers on and off the coating apparatus. Thus the filtering must be performed in darkness and therefore a complicated process requiring excessive manipulation is not suitable.

U.S. Pat. No. 4,643,981-Card discloses a process where a material to be filtered is placed into a tube and a filter assembly is forced downward through tube such that material is forced upward through the filter and sediment remains at the bottom of the tube. This system is believed to suffer the difficulty that the seal at edge of the tube is not complete and turbulence causing bubbles may result from the pressure application of the plunger.

U.S. Pat. No. 3,793,805-Hoffman and U.S. Pat. No. 3,904,392-VanIngen et al disclose materials for filtering and degassing photographic emulsions prior to use. However these devices are complicated and not suitable for use with small quantities.

Therefore there remains a need for a filtering method and apparatus that will filter small quantities of photographic material effectively with little waste. Further there is need for a low cost and easy to use system to do this that is effective in removal of bubbles and particles.

THE INVENTION

The object of the invention is a simple system that will effectively remove bubbles and particles from liquids, particularly photographic emulsions.

Another object of the invention is to create a method and apparatus that is simple to operate, particularly in the dark. These and other objects of the invention are generally accomplished by providing an apparatus for filtering that comprises a liquid container and a filtering container designed to be placed within the liquid container. The filtering container is provided with filtering areas on the bottom and/or sides that allow liquid to pass through the sides of the filtering container and be filtered. The liquid then may be withdrawn by pumping from the filtering container. In a preferred form of the invention the containers are closely contoured such that the filtering container fits within the liquid container so that there is very little waste when filtered liquid is withdrawn from the filtering container.

It is also possible in another embodiment of this invention to suspend a filtering container within a much larger liquid container for either continuous or semi-continuous filtering.

BRIEF DESCRIPTION OF THE DRAWINGS

FIG. 1 is a side view of a filtering container in accordance with the invention.

FIG. 2 is a top view of a filtering container in accordance with the invention

FIG. 3 is a cross-sectional view of the filtering container on cross-sectional line 3—3 of FIG. 2.

FIG. 4 illustrates the operation of the filtering container in cross-section.

FIG. 5 is a schematic of a another embodiment of the filtering apparatus and process of the invention.

MODES OF PERFORMING THE INVENTION

Figure 6:
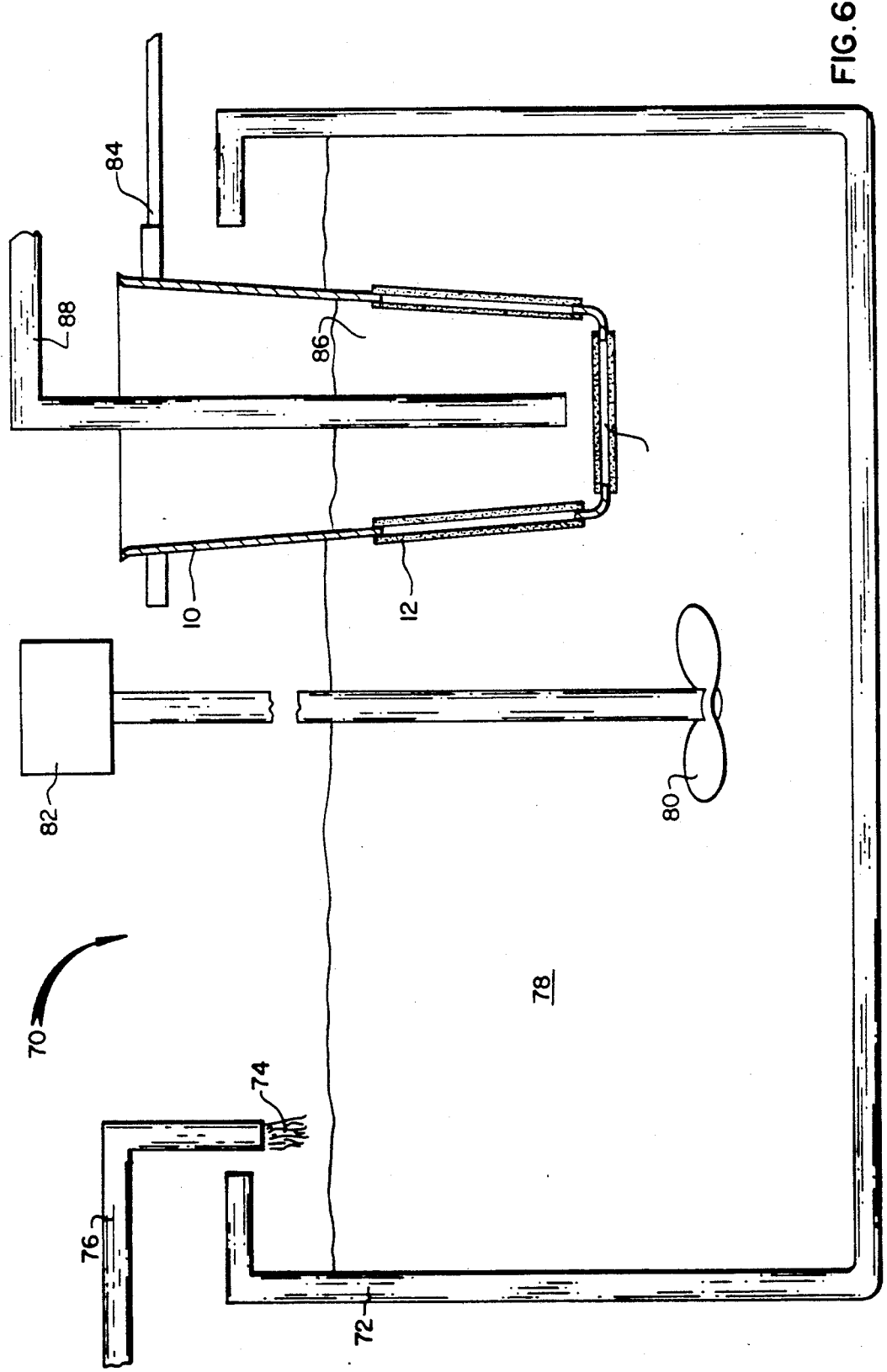
FIG. 6 is a schematic illustration of the apparatus and process of the invention in which the filtering container is used in combination with a large liquid container for continuous operation.

The invention has numerous advantages over other systems, particularly those for handling small quantities of photographic emulsions. The system of the invention is simple but reliable. Further it is low cost as the devices are not disposable and are simple to form. It also has the advantage in that it is particularly effective in removal of bubbles. Another advantage is that the method of the invention provides rapid filtering that does not have to be closely monitored as filtering is complete when the filtering container has sunk to the lowest point into which it will fit in the closely conforming liquid container. These and other advantages will be apparent from the drawing and description that follows.

Illustrated in FIG. 1, 2, and 3 is a filtering container 10 in accordance with the invention. The container has a lower side filtering portion 12 and an upper impermeable area 14. The container also has a bottom filtering portion 15. As shown in the cross-sectional view of FIG. 3 the side filtering portion 12 and bottom filtering area 15 are each composed of two portions, an outer fine filtering member 16 and an inner strong foraminous member 18. Then container 10 also has a solid impervious portion 20 joining the bottom filtering area 14 and side filtering area 12.

In FIG. 4 is illustrated in cross-section the apparatus and process of the invention in the embodiment in which the liquid container 32 closely conforms to the filtering container 10. The filtering container 10 extends almost to the bottom of liquid container 32. The filtering container 10 is placed within liquid container 32 by gently placing it on the liquid 34 and letting it sink as the liquid passes through the bottom filter area 15 and side filtering areas 12 until substantially all the liquid has been filtered. The filtered liquid is removed by withdrawal pipe 36. It is apparent that there will only be a very small amount of liquid 34 in area 38 which is between bottom 15 of the filtering container 10 and the bottom 40 of the liquid container. The withdrawal means 36 may be operated by any of a variety of pumps (process not shown).

FIG. 5 illustrates apparatus 50 for an embodiment of the invention in which container 10 is placed into a liquid container 52 that is of greater diameter than container 10 but of less depth. In operation of the apparatus of system 50 the container 10 is placed into liquid container 52 by holding device 54. As container 10 is lowered into liquid 56, liquid is filtered and passes into the interior area of filtering container 10. The filtered liquid 58 then may be withdrawn through withdrawal pipe 60 for use. As illustrated container 52 is also provided with a magnetic stirrer 62 that is driven in conventional manner by stirrer drive means 64.

FIG. 6 illustrates in schematic view the operation of an apparatus 70 of the invention in which the liquid container 72 is much larger than the filtering container 10. This system may be operated continuously with liquid to be filtered 74 entering through pipe 76. The liquid in the tank 78 is stirred by blade paddle 80 driven by motor drive 82. The filtering container 10 is held by positioning means 84 at a distance that will allow filtered fluid 86 to pass through the filtering areas 12 and 14. Withdrawal of filtered liquid 86 is through withdrawal pipe 88. The level of liquid may be controlled in conventional manner such that the inflow and outflow are balanced.

Figure 7:
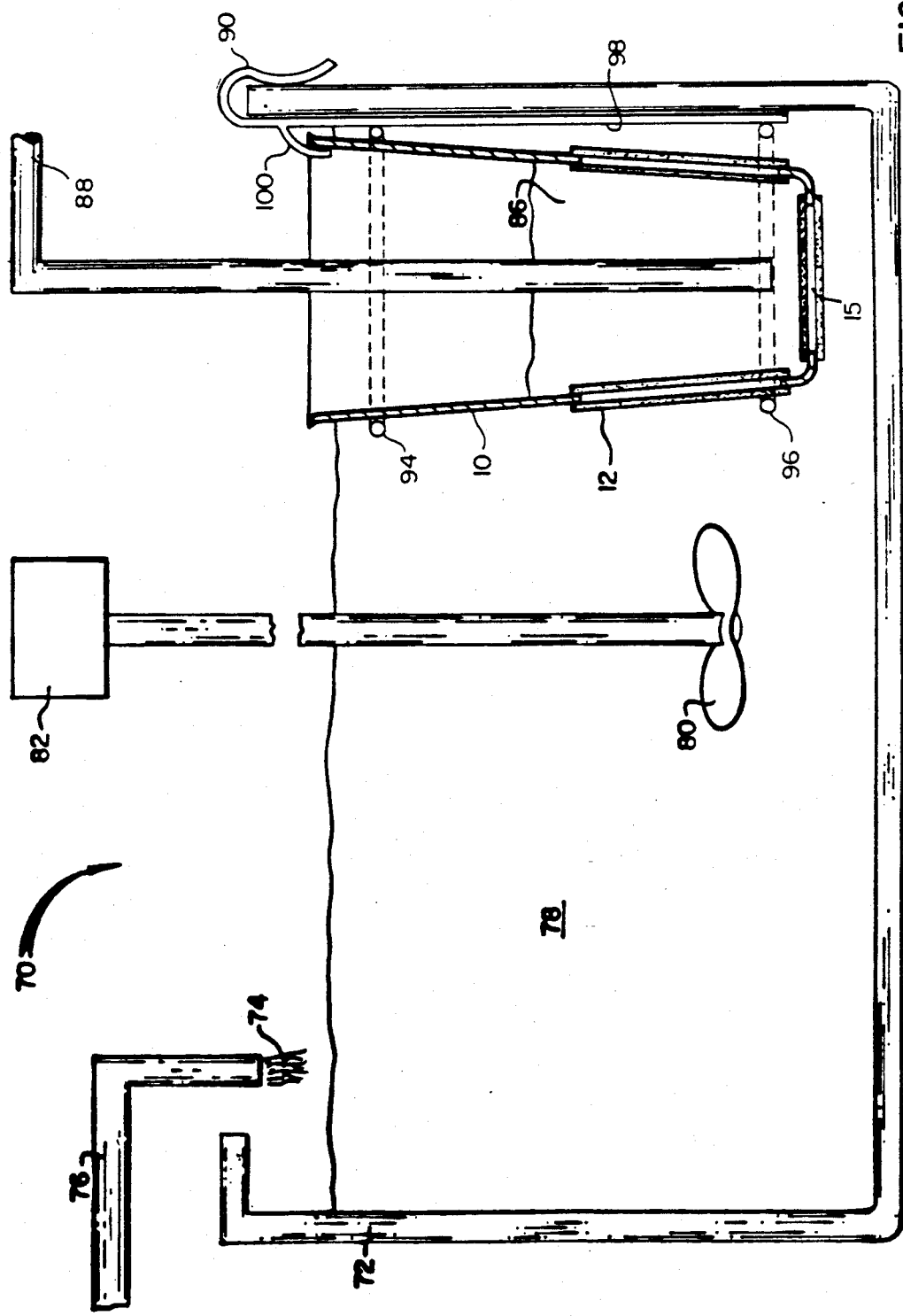
FIG. 7 illustrates an alternative apparatus and process of the invention utilizing a different holder for suspending the filtering container in place.
Figure 8:
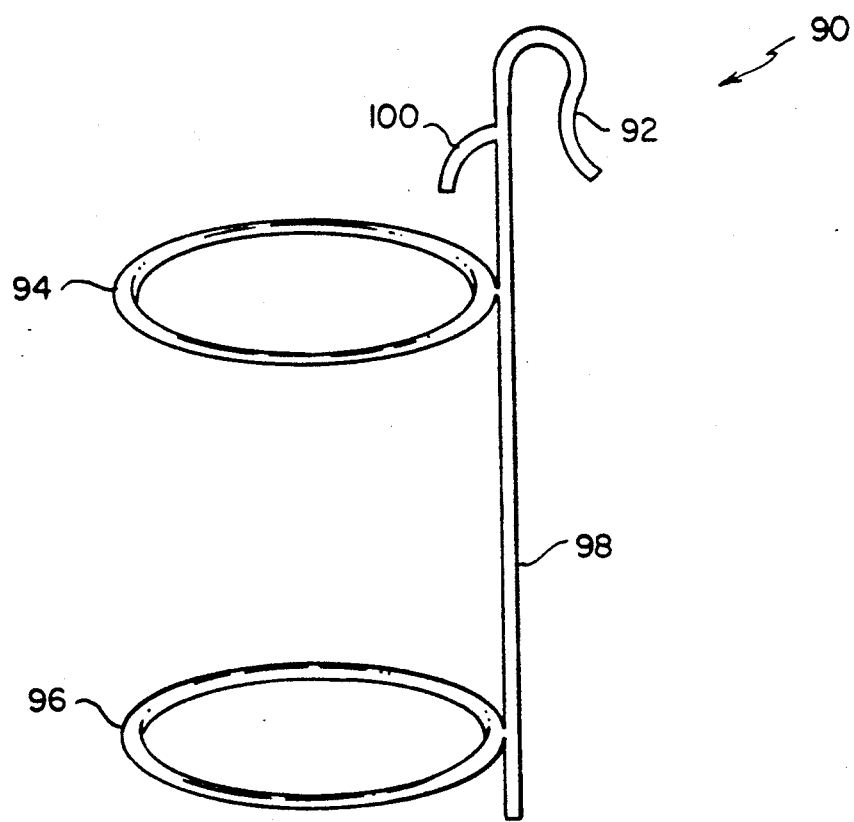
FIG. 8 is a prospective view of the holder for the filtering container utilized in FIG. 7.

FIG. 7 illustrates in schematic view apparatus 70 as in FIG. 6 but utilizing a different filtering container holder 90. Filtering container 90 is composed of a hanger 92 that is placed over the edge of container 72. The hanger 90 has a vertical number 98 for positioning along the inner wall of container 72. The filtering container 10 is held by the holding rings 94 and 96. Clip 100 also aids in stabilizing filtering container 10. FIG. 8 is a perspective view of the holder 90.

The filtering medium of the invention may be any type having openings that will allow use of the filtering device with a particular liquid to be filtered. A preferred form is to have a outer fine filtering member that is used in combination with a strong backing member. This is particularly desirable for use with photographic emulsions. A preferred filter size for photographic emulsions has been found to be between about 8 and about 60 micron opening size for successful removal of particles and bubbles. A preferred range is between about 15 and about 20 micron openings in the screen for removal of bubbles and small particles without removal of silver halide grains. The inner strengthening layer should be strong enough to prevent deformation but not interfere with filtering. For use in photographic systems and many other uses it is preferred that the filtering container be formed from stainless steel for ease of cleaning and non-contamination of material being filtered. While the process and apparatus of the invention find their most preferred use for filtering of photographic emulsions and dispersions the process and apparatus of the invention is also suitable for filtering other materials. It is suitable for use with paints and food products. The invention is thought to be particularly suitable for materials such as varnishes in which air bubbles in coatings are a problem and convenient low cost filter for their removal is desired.

The filtering container and the liquid container may be formed in any suitable shape. While illustrated with round containers it is also possible that the containers could be rectangular or square. While illustrated with and preferably made of stainless steel for photographic uses the containers of the invention could be made of other materials. Suitable for the uses would be various non reactive polymeric plastics and aluminum. The invention has been illustrated with the removal of filtered liquid by pumping through a withdrawal pipe. However, it is also possible that filtered liquids could be poured from the filtering container either after removal from the liquid container or a seal may be provided between the two containers to allow the pouring without leakage of unfiltered material. Pouring is less preferred as it may introduce bubbles.

The invention has been described in detail with particular reference to preferred embodiments thereof. However it will be understood that variations and modifications can be effected within the scope and spirit of the invention. For instance the filtering device could be utilized to filter materials than photographic emulsion such as medicines. Also, while illustrated with filtering media on the sides and bottom of the container it is possible that filtering media could only be at the sides or only at the bottom. In the invention only intended to be limited by the scope of the claims attached hereto.

I claim:

1. An apparatus for filtering comprising a liquid container and a filtering container, wherein said liquid container is provided with an open top, closed sides and closed bottom, said filtering container is provided outer members at the sides and bottom, said outer members at said sides and bottom are at least partially comprised of a filtering medium, said filtering container fits snugly into at least the bottom of said liquid container, and said apparatus further comprises a liquid withdrawal member extending into said filtering container.

2. The apparatus of claim 1 wherein said filter medium has openings no smaller than 8 micron.

3. The apparatus of claim 1 wherein the said filter medium comprises a strong foraminous member and a fine filtering member.

4. The apparatus of claim 1 wherein said filtering container and said liquid container are cups.

5. The apparatus of claim 1 wherein said filtering medium has openings of about 15 to about 20 microns.

6. A process of filtering comprising providing a liquid container having a open top and closed sides and bottom, providing a filtering container having members forming the sides and bottom with at least one of said members provided with filtering means, said filtering container fits at least partially into said liquid container, placing a liquid to be filtered into said liquid container, placing said filtering container into said liquid container and into said liquid whereby said liquid substantially free of bubbles passes through said filtering means and into said filtering container, and removing filtered liquid from said filtering container.

7. The process of claim 6 wherein said liquid comprises an emulsion of photographic components.

8. The process of claim 7 wherein said photographic components comprise silver halide and gelatin.

9. The process of claim 6 wherein said filtering container fits snugly into at least the bottom of said liquid container.

10. The process of claim 6 wherein said containers are cups.

11. The process of claim 6 wherein said liquid in said liquid container is stirred while filtered liquid is withdrawn from said filtering container.

12. The process of claim 6 wherein said liquid comprises a dispersion of photographic components.

13. The process of claim 6 wherein said liquid comprises gelatin.

14. A process of filtering comprising providing a liquid container having an open top and closed sides and bottom, providing a filtering container having members forming the sides and bottom with at least one of said members provided with filtering means, said filtering container being adapted to fit into said liquid container, placing an emulsion of photographic components into said liquid container, placing said filtering container into said liquid container and removing filtered liquid from said filtering container.

15. The process of claim 14 wherein said filtered liquid is substantially free of bubbles.

16. A process of filtering comprising providing a liquid container having an open top and closed sides and bottom, providing a filtering container having members forming the sides and bottom with at least one of said members provided with filtering means, said filtering container fits at least partially into said liquid container, placing a liquid comprising gelatin into said liquid container, placing said filtering container into said liquid container and into said liquid whereby said liquid passes through said filtering means and into said filtering container, and removing filtered liquid from said filtering container.

* * * * *